(12) United States Patent
Roy

(10) Patent No.: US 8,882,115 B1
(45) Date of Patent: Nov. 11, 2014

(54) MANUAL CART FOR TRANSPORTATION OF ELECTRONIC EQUIPMENT WITHIN A DATA CENTER

(71) Applicant: Switch Communications Group LLC, Las Vegas, NV (US)

(72) Inventor: Rob Roy, Las Vegas, NV (US)

(73) Assignee: Switch LLC, Las Vegas, NV (US)

( * ) Notice: Subject to any disclaimer, the term of this patent is extended or adjusted under 35 U.S.C. 154(b) by 138 days.

(21) Appl. No.: 13/843,022

(22) Filed: Mar. 15, 2013

(51) Int. Cl.
*B62B 3/00* (2006.01)
*B62B 3/04* (2006.01)
*B62B 3/06* (2006.01)

(52) U.S. Cl.
CPC ..................................... *B62B 3/002* (2013.01)
USPC .................. 280/79.11; 280/47.34; 280/47.35; 280/2

(58) Field of Classification Search
CPC ................ B62B 3/00; B62B 3/04; B62B 3/06
USPC .............................. 280/47.34, 47.35, 2, 79.11
See application file for complete search history.

(56) References Cited

U.S. PATENT DOCUMENTS

| | | | |
|---|---|---|---|
| 6,079,941 A * | 6/2000 | Lee ................................ | 414/812 |
| 6,824,150 B2 * | 11/2004 | Simione ..................... | 280/47.34 |
| 2010/0314849 A1 * | 12/2010 | Realegeno-Amaya .... | 280/79.11 |
| 2012/0018966 A1 * | 1/2012 | Moore et al. ............... | 280/79.11 |

* cited by examiner

*Primary Examiner* — Hau Phan
*Assistant Examiner* — Bryan Evans
(74) *Attorney, Agent, or Firm* — Pillsbury Winthrop Shaw Pittman LLP

(57) ABSTRACT

The present invention provides a manual cart for safe and efficient transportation of electronic equipment such as server racks and equipment cabinets within a data center or co-location facility. Methods of moving the electronic equipment within a data center or co-location facility in such manual carts are also described.

20 Claims, 6 Drawing Sheets

MANUAL CART FOR TRANSPORTATION OF ELECTRONIC EQUIPMENT WITHIN A DATA CENTER

BACKGROUND

1. Field of the Invention

The present invention relates to a manual cart for transportation of electronic equipment within a data center or co-location facility.

2. Background of the Invention

Data centers and server co-location facilities are well-known. In such facilities, rows of electronics equipment, such as servers, typically owned by different entities, are stored. In many facilities, cabinets are used in which different electronics equipment is stored, so that only the owners of that equipment, and potentially the facility operator, have access therein. In many instances, the owner of the facilities manages the installation and removal of servers within the facility. Consequently, there is a need for a cart to assist in the safe and efficient transportation of this electronic equipment within the facility—from a loading dock into an operating position within a cabinet, for example.

SUMMARY

The present invention provides a manual cart for safe and efficient transportation of electronic equipment, such as server racks and equipment cabinets, within a data center or co-location facility. Methods of moving the electronic equipment within a data center or co-location facility in such manual carts are also described.

According to aspects of the invention, a cart for transportation of electronic equipment through a data center, said cart being manually propelled and guided, may comprise: a rectangular bed with a horizontal base and vertical walls on three sides, wherein the open side is a short side; two rectangular wheel plates attached one on either side of the bed to the top edges of the longer two of said vertical walls, said rectangular wheel plates being in a horizontal plane, two wheels being attached to the underside of each of said rectangular wheel plates, said rectangular wheel plates having the same length as said rectangular bed; a vertical skirt attached to said rectangular wheel plates around the outer edges of said rectangular wheel plates, said vertical skirt having a height equal to the height of said vertical walls of said rectangular bed; a frame attached to said rectangular bed, wherein said frame includes four vertical struts attached one to each corner of said rectangular bed and three horizontal struts attached between said vertical struts at the top of said vertical struts, said three horizontal struts being positioned above said vertical walls of said rectangular bed; and a gate attached to said horizontal base at the open end of said rectangular bed by one or more hinges, said gate being securable in a vertical plane. Furthermore, restraints may be attached one to each of the two vertical struts of said frame at the opposite end of said rectangular bed to the open side of said rectangular bed and the position of attachment of said restraints on the vertical struts is distal to said rectangular bed; said restraints being usable for securing a load in said cart. Furthermore, said cart may be configured to provide a clearance of less than or equal to one inch between said horizontal base and the horizontal plane defined by the bottom of the wheels attached to said wheel plates, for maintaining a low center of gravity for said cart. Furthermore, the height of the horizontal struts of said frame above the horizontal base of said rectangular bed may be between 40 and 50 inches, for enabling the securing of tall loads. Furthermore, a winch bracket may be attached to the outer side of the short vertical wall of said rectangular bed and a winch securable in said bracket, for assisting in loading heavy equipment.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

The present invention provides a manual cart for safe and efficient transportation of electronic equipment, such as server racks and equipment cabinets, within a data center or co-location facility. Ease of manually maneuvering the cart from a loading dock where customer equipment is received to the cabinet where the equipment is to be installed in the facility is required, and the cart is designed accordingly.

Figure 1A:
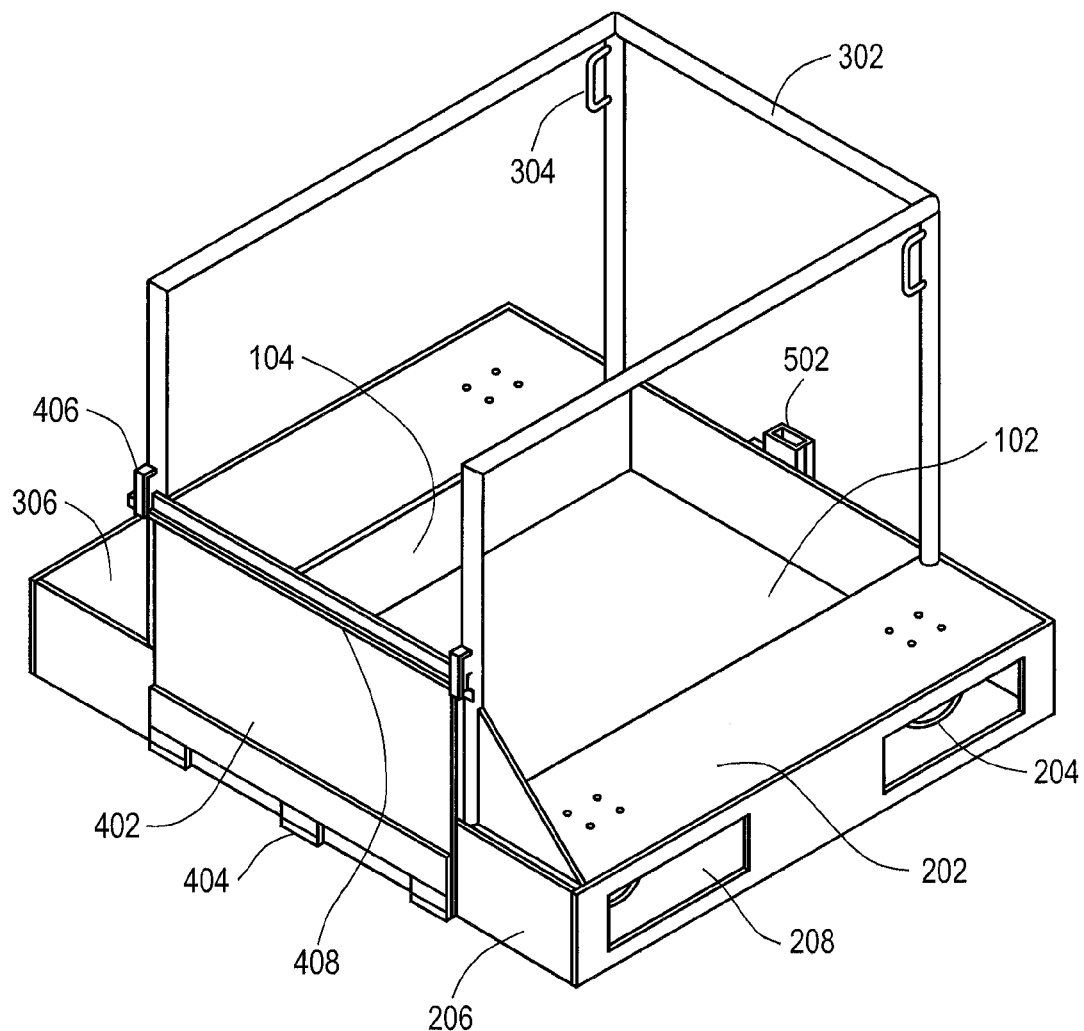
FIG. 1A is a perspective view of a manual equipment cart, according to some embodiments of the present invention.
Figure 1B:
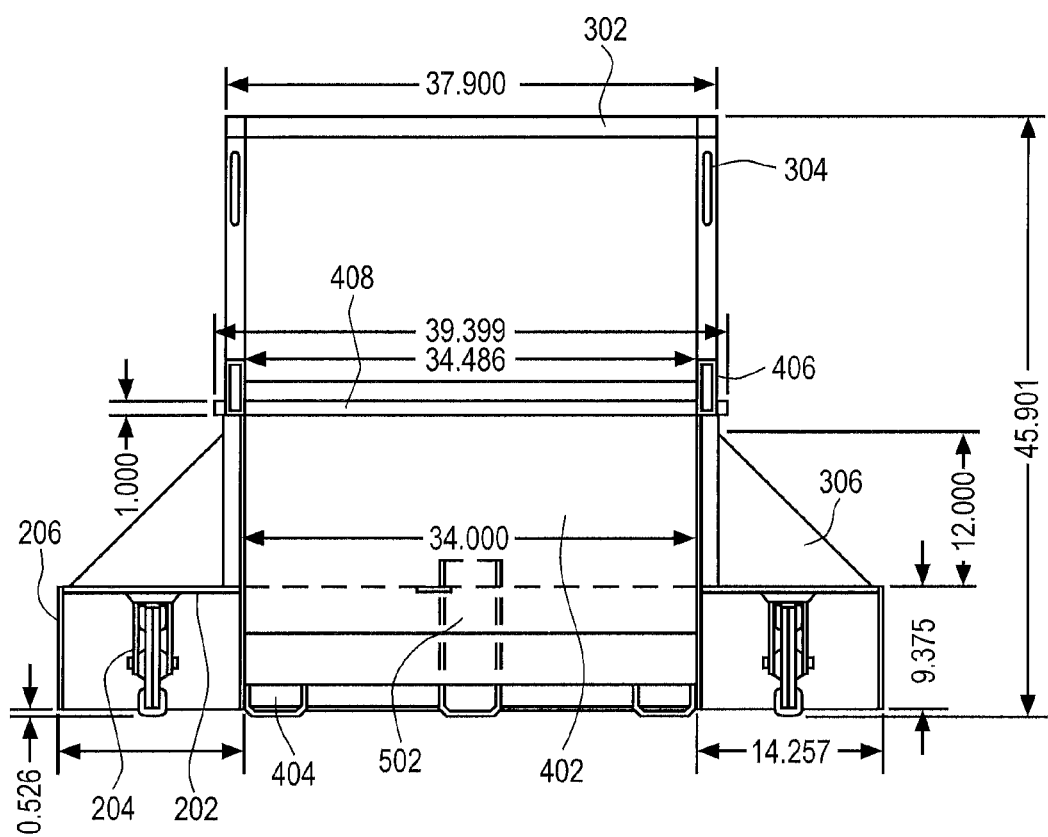
FIG. 1B is a front view of the equipment cart of FIG. 1A.
Figure 1C:
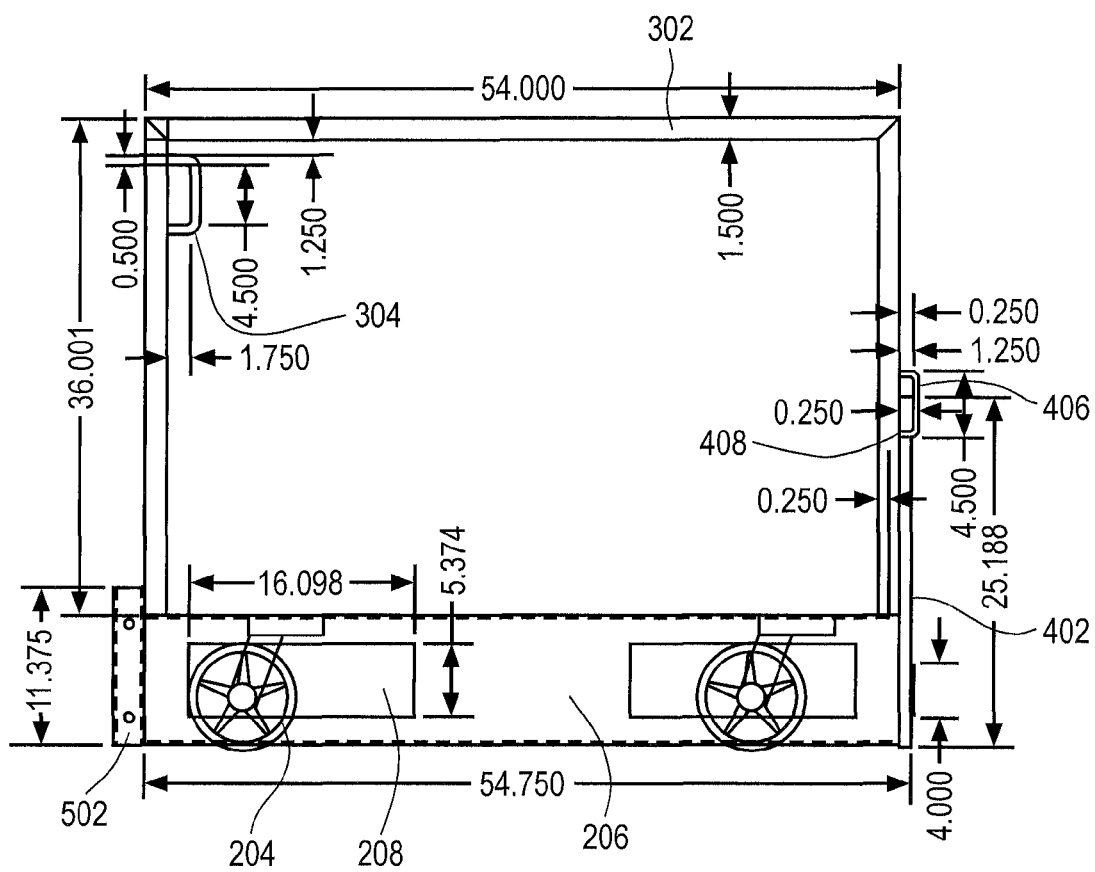
FIG. 1C is a side view of the equipment cart of FIG. 1A.
Figure 1D:
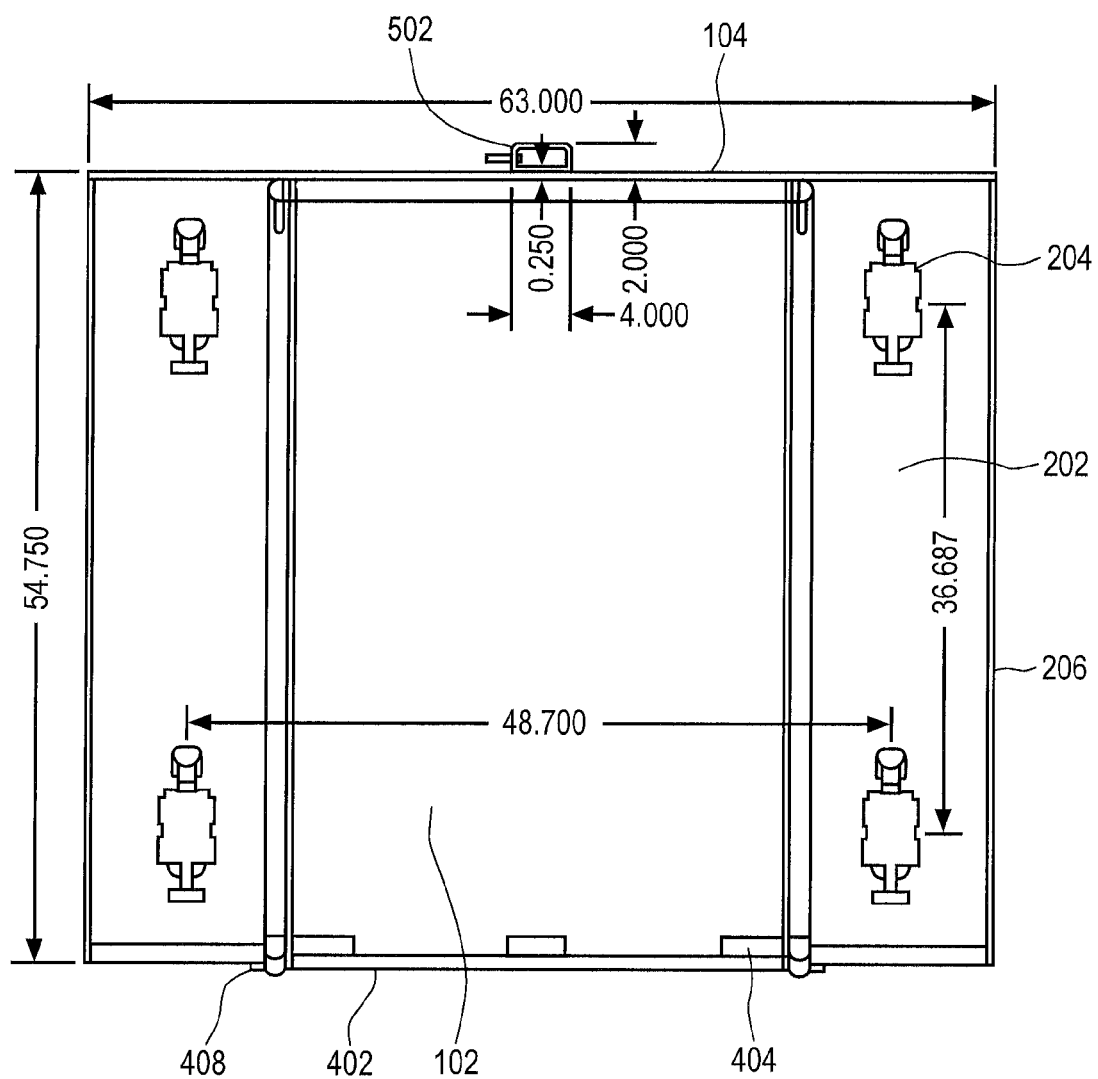
FIG. 1D is a bottom view of the equipment cart of FIG. 1A.
Figure 2:
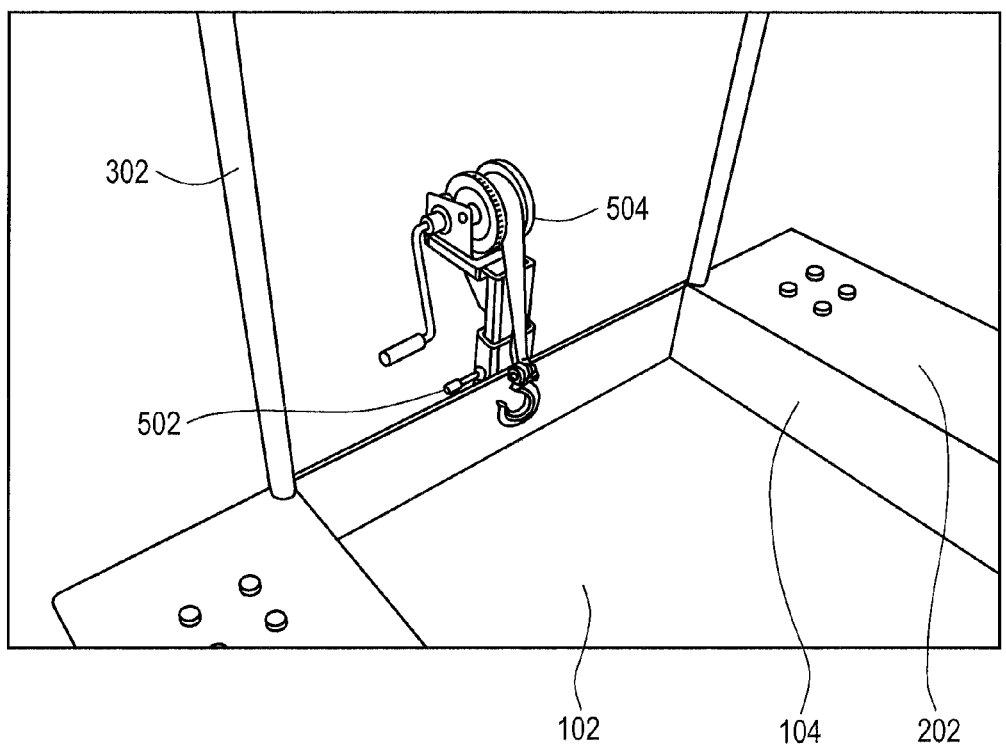
FIG. 2 is a perspective view of the back end of the cart showing a cart winch in place, according to some embodiments of the present invention.

FIGS. 1A-1D show an equipment cart comprising: a rectangular bed with a horizontal base 102 and vertical walls 104 on three sides, where the open side is a short side; two rectangular wheel plates 202 attached one on either side of the bed to the top edges of the longer two of the vertical walls, with wheels 204 attached to the undersides of the wheel plates, there being a skirt 206 around the outer edges of the wheel plate and apertures 208 in the skirt adjacent to the wheels; a frame 302 is attached to the bed, where the frame includes four vertical struts attached on each corner of the bed and three horizontal struts attached between the vertical struts at the top of the vertical struts, the three horizontal struts being positioned above the three vertical walls of the bed, two restraints 304 are positioned on the two vertical struts at the opposite end of the bed to the open side of the bed and the position of attachment of the restraints to the vertical struts is distal to the rectangular bed, and two triangular brackets each attached between a different one of the two vertical struts adjacent to the open end of said rectangular bed and the top surface of the corresponding adjacent wheel plate; a gate 402 is attached to the bed base at the open end of the bed by hinges 404 and the gate is secured by gate restraints 406 attached to the vertical struts of the frame in combination with gate bar 408 which slides into the gap behind both gate restraints and in front of the gate; winch bracket 502 is attached to the outer side of the bed wall positioned opposite to the open end of the bed. FIG. 2 shows a manual winch 504 secured in winch bracket 502; use of the manual winch 504 is described below. FIGS. 1C-1D provide representative measurements in inches for the different parts of the cart; these measurements may be changed, although the dimensions of the cart are intended to be compatible with manual movement of the cart by one or more persons.

The cart is designed to be maneuvered manually by one or more people using the frame to guide the cart; the weight and size of the cart is commensurate with manual maneuvering. The cart may be fabricated from sheet metal, with a gauge and finish suitable for the intended application of manually moving electronic equipment within a data center or co-location facility. Brakes are included on the cart for immobilizing the cart when required for loading/unloading, etc.—for example, the brakes may be wheel locks accessed through the apertures 208 in the skirt 206.

In order to provide rigidity to the various panels of the cart without using heavy gauge sheet metal, a box-type design is utilized. For example, the skirts 206 around the wheel plates 202 and the bed walls 104 provide mechanical stability to the cart, as does the frame 302 and the triangular brackets 306.

In order to keep the center of gravity for the cart very close to the floor, and to facilitate in loading and unloading heavy electronic equipment into and from the cart, the bed base 102 is very close to the ground—roughly half an inch above the ground in the example shown in FIG. 1B. In other embodiments the clearance may be less than or equal to one inch. Note that this low clearance is feasible since the cart is being used in a facility with very smooth and flat floors, although transitions in floor level may need to be negotiated, particularly at doorways. (These transitions are typically less than half an inch in height.) Furthermore, the wheels 204 are attached to the wheel plates 202 in positions close to the corners of the cart (see FIG. 1D) to provide for stability and maneuverability; the wheels are swivel mounted to the wheel plate 202.

The height of the frame 302—approx. 46 inches above the ground in the example shown in FIG. 1B—protects taller equipment such as server stacks, etc., from hitting other objects during transport and also prevents such equipment from toppling out of the cart during maneuvering. More generally, the height of the frame above the base of the rectangular bed is between 40 and 50 inches. Taller loads, such as equipment racks and cabinets and other items over 40 inches in height for example, may be secured to the frame at the restraints 304. For example, once a taller load is loaded into the cart, a ratchet strap may be secured to one of the restraints 304, wrapped around the load, and secured to the second restraint 304; the ratchet strap is properly tightened to secure the load. The lack of a horizontal frame piece over the loading gate of the bed permits items taller than the frame to be loaded into the bed as well as making human access to the bed easier.

Figure 3A:
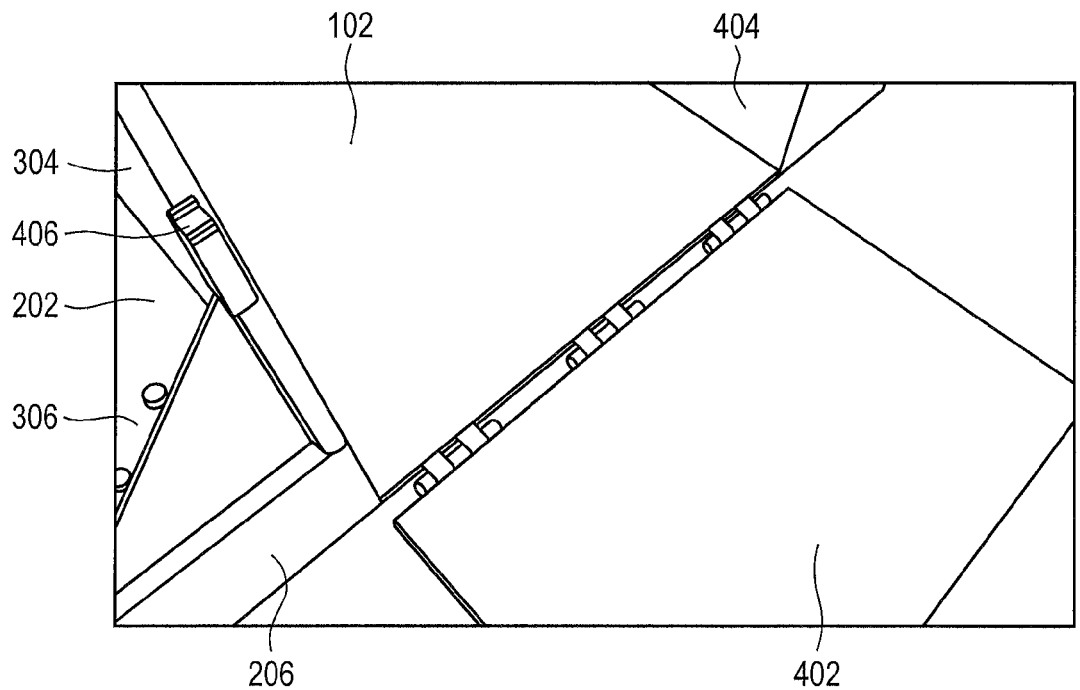
FIG. 3A is a perspective view of the front end of the cart of FIG. 1A with the gate down, according to some embodiments of the present invention.
Figure 3B:
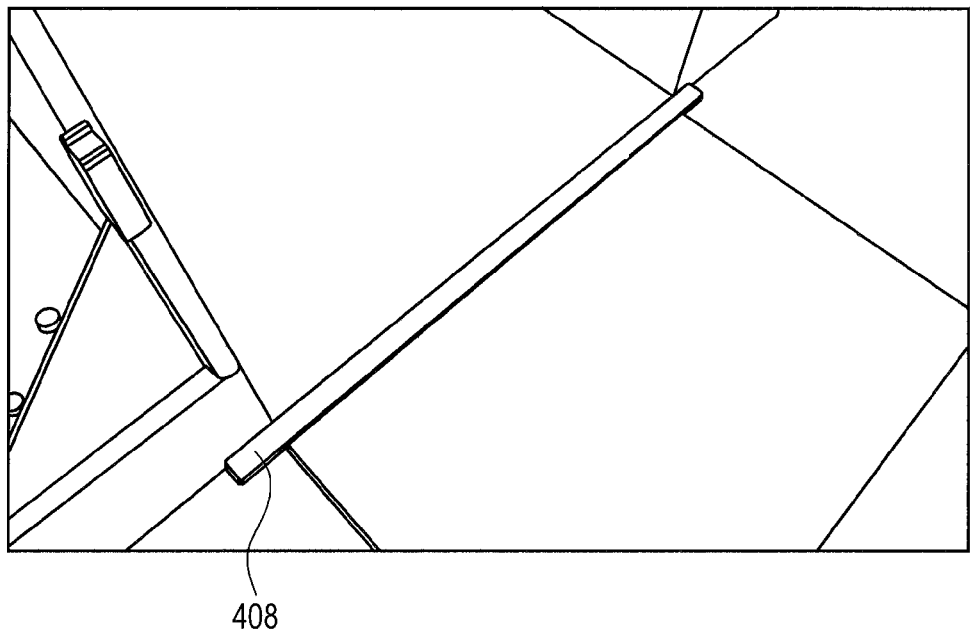
FIG. 3B is the perspective view of FIG. 3A with a flat bar in place across the gate hinges, according to some embodiments of the present invention.

The gate 402 can be released from a locked upright position (shown in FIG. 1A) by removing the bar 408 and the gate is then dropped to the floor for loading and unloading the cart. The hinges 404 attach the gate to the bed base 102 and also define the axis about which the gate hinges. FIGS. 3A & 3B show how the bar 408 may also be used to fill the gap between the horizontal base 102 of the rectangular bed and the gate 402, covering the hinges 404; the bar may be fabricated specifically for these dual purposes and is accordingly flat and machined to conform to the gap between the bed and the gate, as well as being long enough to secure the gate in place in its vertical position using the gate restraints 406.

FIG. 2 shows the manual winch 504 secured in place in winch bracket 502. The manual winch may be used to assist in loading heavy equipment into the cart. This loading method may involve the following steps. A strap is placed around the equipment, such as a tall equipment cabinet, at a suitably low position so as to avoid toppling the equipment during the loading—the strap should be attached below the level of the center of gravity of the equipment. The strap around the cabinet is then attached to the winch strap. When ready, one operator cranks the winch while a number of other operators assist in guiding the cabinet into the cart. The process may be reversed to assist in unloading the equipment from the cart.

The width and length of the cart—63 inches by 55 inches in the example shown in FIG. 1D—are chosen for ease of maneuvering in a data center or co-location facility where electronic equipment is positioned in cabinets accessed by aisles. The size of the horizontal base of the rectangular bed shown in FIGS. 1A-1D is approximately 54 inches by 34 inches and is suitable for moving server racks and equipment cabinets. More generally, the dimensions of the horizontal base of the rectangular bed may be a length of between 45 inches and 65 inches and a corresponding width of between 29 inches and 41 inches. These dimensions may be varied to suit the environment and equipment being moved.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures.

What is claimed is:

1. A cart for transportation of electronic equipment through a data center, said cart being manually propelled and guided, comprising:

a rectangular bed with a horizontal base and vertical walls on three sides, wherein the open side is a short side;

two rectangular wheel plates attached one on either side of the bed to the top edges of the longer two of said vertical walls, said rectangular wheel plates being in a horizontal plane, two wheels being attached to the underside of each of said rectangular wheel plates, said rectangular wheel plates having the same length as said rectangular bed;

a vertical skirt attached to said rectangular wheel plates around the outer edges of said rectangular wheel plates;

a frame attached to said rectangular bed, wherein said frame includes four vertical struts attached one to each corner of said rectangular bed and three horizontal struts attached between said vertical struts at the top of said vertical struts, said three horizontal struts being positioned above said vertical walls of said rectangular bed; and a gate attached to said horizontal base at the open end of said rectangular bed by one or more hinges, said gate being securable in a vertical plane.

2. The cart of claim 1, further comprising restraints attached one to each of the two vertical struts of said frame at the opposite end of said rectangular bed to the open side of said rectangular bed and the position of attachment of said restraints on the vertical struts is distal to said rectangular bed.

3. The cart of claim 1, wherein each of said wheels is attached to the corresponding rectangular wheel plate by a swivel mount to allow for the wheel to rotate about a vertical axis passing through said swivel mount.

4. The cart of claim 1, wherein said cart is configured to provide a clearance of less than or equal to one inch between said horizontal base and the horizontal plane defined by the bottom of the wheels attached to said wheel plates.

5. The cart of claim 1, wherein said cart is configured to provide a clearance of less than or equal to half an inch between said horizontal base and the horizontal plane defined by the bottom of the wheels attached to said wheel plates.

6. The cart of claim 1, wherein said vertical skirt has one aperture adjacent to each of said wheels, each of said apertures being configured to allow for manual access to the corresponding wheel.

7. The cart of claim 1, wherein the four wheels are configured on said cart with one of the four wheels in close proximity to each of the four outer corners of said cart.

8. The cart of claim 1, wherein the height of the horizontal struts of said frame above the horizontal base of said rectangular bed is between 40 and 50 inches.

9. The cart of claim 1, wherein the horizontal base of said rectangular bed has a length of between 45 inches and 65 inches and a corresponding width of between 29 inches and 41 inches.

10. The cart of claim 1, further comprising two triangular brackets each attached between a different one of the two vertical struts adjacent to the open end of said rectangular bed and the top surface of the corresponding adjacent rectangular wheel plate.

11. The cart of claim 1, wherein said gate is securable in a vertical plane by gate restraints attached to the vertical struts of said frame at the open end of said rectangular bed and a gate bar which slides into the gap behind both gate restraints and in front of said gate.

12. The cart of claim 11, wherein said gate bar is configured to fit between said horizontal base of said rectangular bed and said gate when said gate is in a lowered position, said gate bar covering said hinges and being flush with said gate and said horizontal base.

13. The cart of claim 1, further comprising a winch bracket attached to the outer side of the short vertical wall of said rectangular bed and a winch securable in said bracket.

14. A method of manually transporting electronic equipment through a data center on a cart, comprising:
loading electronic equipment onto said cart;
after said loading, stabilizing said electronic equipment in said cart using a strap secured at restraints attached to said cart;
after said stabilizing, manually maneuvering said cart across a substantially flat floor; and
after said manually maneuvering, unloading said cart;
wherein said cart comprises:
a rectangular bed with a horizontal base and vertical walls on three sides, wherein the open side is a short side;
two rectangular wheel plates attached one on either side of the bed to the top edges of the longer two of said vertical walls, said rectangular wheel plates being in a horizontal plane, two wheels being attached to the underside of each of said rectangular wheel plates, said rectangular wheel plates having the same length as said rectangular bed;
a vertical skirt attached to said rectangular wheel plates around the edges of said rectangular wheel plates not attached to said vertical walls of said rectangular bed;
a frame attached to said rectangular bed, wherein said frame includes four vertical struts attached one to each corner of said rectangular bed and three horizontal struts attached between said vertical struts at the top of said vertical struts, said three horizontal struts being positioned above said vertical walls of said rectangular bed, and the restraints attached one to each of the two vertical struts of said frame at the opposite end of said rectangular bed to the open side of said rectangular bed and the position of attachment of said restraints on the vertical struts is distal to said rectangular bed; and
a gate attached to said horizontal base at the open end of said rectangular bed by one or more hinges, said gate being securable in a vertical plane;
wherein the height of the horizontal struts of said frame above the horizontal base of said rectangular bed is between 40 and 50 inches.

15. The method of claim 14, wherein said electronic equipment is a server rack.

16. The method of claim 14, wherein said electronic equipment exceeds 40 inches in height.

17. The method of claim 14, further comprising manually maneuvering said cart across a height transition in the floor level, said height transition being less than half an inch.

18. The method of claim 14, wherein said loading includes attaching a first strap around said electronic equipment, attaching a winch strap to said first strap and manually winching said equipment into said cart, wherein said cart further comprises a winch bracket attached to the outer side of the short vertical wall of said rectangular bed and a winch secured in said bracket.

19. The method of claim 14, further comprising, both before said loading, lowering said gate to the floor and placing a bar between said horizontal base of said rectangular bed and said gate, said gate bar covering said hinges and being flush with said gate and said horizontal base.

20. The method of claim 19, further comprising, after said loading, raising said gate into a vertical position and securing said gate by sliding said bar in front of said gate and into the gaps behind gate restraints attached to the vertical struts of said frame at the open end of said rectangular bed.

* * * * *